Patented July 18, 1933

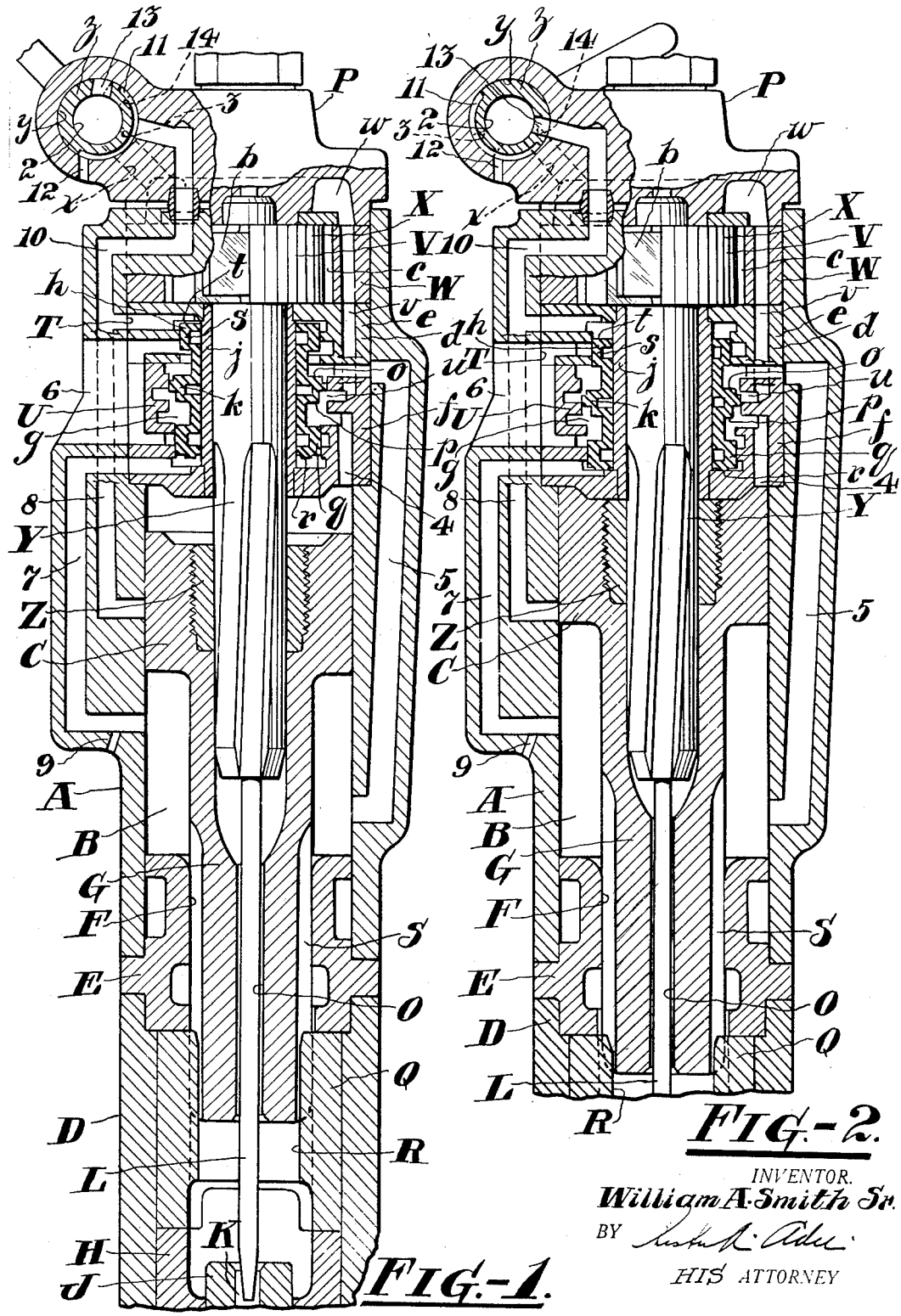

1,918,787

UNITED STATES PATENT OFFICE

WILLIAM A. SMITH, SR., OF EASTON, PENNSYLVANIA, ASSIGNOR TO INGERSOLL-RAND COMPANY, OF JERSEY CITY, NEW JERSEY, A CORPORATION OF NEW JERSEY

BLOWING DEVICE

Application filed December 18, 1930. Serial No. 503,207.

This invention relates to rock drills, but more particularly to a blowing device for rock drills of the fluid actuated type.

One object of the invention is to assure an abundant and uninterrupted supply of pressure fluid to the hole being drilled for the purpose of removing the cuttings therefrom.

Another object is to control the admission of the supply of pressure fluid distributed to the ends of the piston chamber for actuating the hammer piston and the supply of pressure fluid utilized for cleansing the drill hole by a common control means.

Other objects will be in part obvious and in part pointed out hereinafter.

In the drawing accompanying this specification and in which similar reference characters refer to similar parts, Figure 1 is a sectional elevation of a rock drill equipped with a blowing device constructed in accordance with the practice of the invention, and Figure 2 is a similar view illustrating the position of the parts during the blowing operation.

Referring to the drawing, the invention is shown embodied in a rock drill comprising a cylinder A having a piston chamber B to accommodate a reciprocatory hammer piston C.

At the front end of the cylinder A is a front head D which is centralized with respect to the cylinder by a front cylinder bushing E which forms a closure for the front end of the piston chamber B and has a bore F to receive an extension G of the piston C. Within the front head D is a chuck H to receive and guide a working implement J against which the extension G of the piston C is adapted to strike.

The working implement may be suitably interlocked with the chuck H and has a passage K therethrough for conveying cleansing fluid, such as water or pressure fluid, or both, into the drill hole to remove the cuttings therefrom. The rock drill may therefore be provided with a tube L which extends into the passage in the drill steel and through a bore O in the piston C and may be seated in a well known manner with its rear end in a back head P.

In order to effect rotary movement of the chuck H and the working implement J the chuck H is suitably interlocked with a chuck nut Q disposed rotatably in the front head D and having introverted ribs R to engage flutes S in the outer surface of the extension G of the piston C.

In the rear end of the cylinder A is an enlarged bore T to receive valve mechanism designated generally by U and rotation mechanism designated generally by V. The rotation mechanism is arranged near the extreme rearmost end of the bore T and comprises a ratchet ring W surrounding the head X of a rifle bar Y. The rifle bar Y extends through the valve mechanism U and into the piston chamber B where it is in fluted engagement with a rifle nut Z threaded into the piston C.

The head X carries the usual spring pressed pawls $b$ for engagement with teeth $c$ on the inner surface of the rotation ratchet W to effect a step by step rotary movement of the working implement J through the instrumentalities connecting the rifle bar Y with the working implement.

The back head P in this instance is seated upon the rotation ratchet W and the rotation ratchet in turn is seated upon a valve chest $d$ which forms a closure for the rear end of the piston chamber B. The back head P, the front head D and the cylinder A form the casing parts of the drill and may be clamped securely together in the proper assembled relationship by any suitable means, as for instance by side bolts (not shown).

The valve chest $d$ comprises a plate $e$ upon which the rotation ratchet W seats, and a plug $f$ which serves as a seat for the plate $e$ and is located adjacent the rear end of the piston chamber B. The plate $e$ and the plug $f$ are bored to form a valve chamber $g$ for the accommodation of a distributing valve $h$. The valve $h$ is illustrated as being of the hollow spool type. It is slidable on a bushing $j$ which encircles the rifle bar Y and is seated with its ends in the plate $e$ and the plug $f$ to assure against leakage of pressure fluid from the valve chamber $g$ into the piston chamber B.

The valve $h$ has an intermediate flange $k$, the rear and front ends $o$ and $p$ respectively of which constitute holding areas against which pressure fluid may act to assist in holding the valve $h$ in its limiting positions. On the forward end of the valve $h$ is a head $q$ the front end of which constitutes an actuating area $r$ against which pressure fluid may act for throwing the valve $h$ rearwardly. Similarly, at the rear end of the valve is a head $s$ having a rear actuating area $t$.

The pressure fluid to be distributed by the valve $h$ is admitted into the valve chamber through a supply port $u$ which is controlled by the intermediate flange $k$. The supply port $u$ is the outlet opening of a supply passage $v$ located in the valve chest $d$ and the rotation ratchet W and which passage $v$ communicates at its opposite end with a supply reservoir $w$ in the back head P.

Pressure fluid is conveyed to the supply reservoir $w$ by a passage $x$ in the back head and leading to a throttle valve chamber $y$, also in the back head. In the throttle valve chamber $y$ is a rotary throttle valve $z$ the interior 2 of which may be in constant communication with a source of pressure fluid supply through a suitable conduit (not shown). The throttle valve $z$ has a port 3 to register with the passage $x$ for admitting pressure fluid into the supply reservoir $w$ and thus to the valve chamber $g$.

The pressure fluid utilized for actuating the piston C on its working stroke is conveyed into the rear end of the piston chamber B by a rear inlet passage 4 in the plug $f$ and opening with one end into the rear end of the piston chamber and with its other end into the valve chamber $g$ at a point forwardly of the supply port $u$. A front inlet passage 5 in the cylinder A and the valve chest $d$ and having its inlet opening rearwardly of the supply port $u$ conveys pressure fluid to the front end of the piston chamber B to actuate the piston C rearwardly.

The inlet ports 4 and 5 in this instance also serve to convey exhaust fluid from the piston chamber into the valve chamber, whence such fluid may escape to the atmosphere through an exhaust port 6 in the cylinder A and the valve chest $d$ and being controlled by the valve $h$.

In order to effect actuation of the valve $h$ in timed relation with the piston C the drill is provided with a pair of kicker passages 7 and 8 to convey pressure fluid from the piston chamber B for actuating the valve. The kicker passage 7 leads from the piston chamber B at a point forwardly of the transverse median line of the piston chamber to the front end of the valve chamber $g$ to periodically subject the actuating area $r$ to pressure fluid for throwing the valve rearwardly, and the kicker passage 8 leads from the piston chamber B at a point rearwardly of the transverse median line of said piston chamber to the rear end of the valve chamber $g$.

In the cylinder A is an atmospheric vent 9 of smaller area than the kicker passage 7 with which it communicates. Normally the kicker passage 8 also communicates with the atmosphere and is accordingly provided with a branch passage 10 which extends rearwardly through the cylinder A to the valve chamber $y$. In the periphery of the throttle valve $z$ is a groove 11 which, when the throttle valve $z$ is in a position to establish registry between the port 3 and the passage $x$, will afford communication between the branch passage 10 and an atmospheric vent 12 in the back head.

During the normal operation of the rock drill so far described, pressure fluid admitted into the supply chamber $w$ by the throttle valve $z$ will flow through the supply passage $v$ and the port $u$ into the valve chamber $g$ where it will be distributed to the ends of the piston chamber B by the valve $h$.

Upon the admission of pressure fluid into the rear end of the piston chamber B the piston C will be actuated forwardly and uncover the kicker passage 8. Pressure fluid will then flow from the piston chamber through the kicker passage 8 into the rear end of the valve chamber $g$ to act against the actuating area $t$ for throwing the valve forwardly where it will be held momentarily immovable by the pressure fluid flowing over the holding area $o$ to the front inlet passage 5.

After the valve $h$ is thrown forwardly the pressure fluid in the rear ends of the piston and valve chambers will exhaust through the valve chamber and the exhaust port 6 and any compression flowing into the passage 8 during the rearward stroke of the piston will pass to the atmosphere through the branch passage 10, the groove 11 and the vent 12.

The pressure fluid admitted into the front end of the piston chamber B upon the forward movement of the valve $h$ will actuate the piston C rearwardly. When the piston uncovers the kicker passage 7 pressure fluid will flow therethrough into the front end of the valve chamber to act against the actuating area $r$ and throw the valve rearwardly to the position illustrated in Figure 1. The pressure fluid utilized for this purpose may then immediately start exhausting to the atmosphere through the vent 9 and continue so to do until the pressure fluid acting to drive the piston rearwardly has been exhausted through the front inlet passage 5, the valve chamber $g$ and the exhaust port 6 to the atmosphere. Upon the subsequent forward movement of the piston C any compression flowing into the kicker passage 7 may immediately escape to the atmosphere through the vent 9.

Ordinarily, while the drill is operating in the manner described, portions of pressure fluid may flow from both the front and rear ends of the piston chamber B into the chuck mechanism and through the drill steel into the drill hole.

The pressure fluid thus flowing from the rear end of the piston chamber B will pass through the bore O in the piston during the presence of pressure fluid in the rear end of the piston chamber, and during the rearward movement of the piston C some pressure fluid will flow through the flutes S in the extension G into the drill steel.

Under some conditions of drilling the pressure fluid thus supplied to the drill steel may be sufficient to maintain a fairly clean condition in the drill hole, as for instance, when drilling shallow holes or rock of extreme hardness where the progress of the working implement is necessarily slow. When drilling in rock of a moderate degree of hardness, however, and where in consequence the progress of the working implement is comparatively rapid, the light puffs of pressure fluid intermittently introduced into the drill hole from the ends of the piston chamber usually lack the force required to remove all the detritus from the drill hole.

The portions of rock particles of greater specific gravity then accumulate in the drill hole and form a collar of material immediately rearwardly of the cutting bit of the working implement. Once started, this accumulation of detritus will speedily become of sufficient volume to prevent the passage of pressure fluid and dust from the drill hole. Another objectionable feature flowing therefrom is that the collar of pulverized material thus formed will, owing to friction with the wall of the drill hole, seriously hamper the action of the rotation mechanism of the rock drill.

In view of the foregoing facts it is therefore essential that the rock drill be provided with means whereby occasional uninterrupted charges of pressure fluid may be selectively introduced into the drill hole to prevent the undesirable condition above described.

It is, however, desirable that this result be brought about without necessitating the equipping of the rock drill with a multiplicity of controlling devices which would increase the cost of construction and maintenance and would also render it necessary for the operator to shift repeatedly from one controlling device to another which is considered objectionable. Rock drills, as is well known, operate at high speeds which result in terrific vibration of the entire apparatus. For this reason the number of controlling devices should be reduced to a minimum, since each time an operator attempts to shift his hand from one controlling device to another there is danger of contacting with portions of the rapidly vibrating rock drill and therefore of being severely injured.

It is accordingly contemplated to use the throttle valve $z$, in addition to its previously stated function, as a means for controlling the supply of cleansing pressure fluid to the drill hole to maintain a clean condition therein. To this end the throttle valve $z$ is provided with a port 13 to register with the branch passage 10, and the throttle valve $z$ is further provided with a port 14 so located that it will register with the passage $x$ when the throttle valve $z$ is in position to establish registry between the port 13 and the branch passage 10. The ports 3 and 14, both of which are intended to establish communication between the interior of the throttle valve $z$ and the passage $x$, are in the same transverse plane.

The mode of operation of the device is as follows: With the throttle valve $z$ in the position which it occupies during the normal operation of the drill as illustrated in Figure 1, pressure fluid will flow from the interior of the throttle valve through the port 3 and the passage $x$ into the supply reservoir $w$. From the supply reservoir $w$ the pressure fluid flows through the supply passage $v$ into the valve chamber where it is distributed to the ends of the piston chamber by the valve $h$ or, more specifically, by the flange $k$ of the valve.

During the forward stroke the piston C will uncover the kicker passage 8. Pressure fluid will then flow from the piston chamber through the kicker passage 8 into the rear end of the valve chamber $g$ and act against the actuating surface $t$ to throw the valve $h$ forwardly. Pressure fluid will then immediately start exhausting through the branch passage 10, the groove 11 and the vent 12 to the atmosphere. After the valve is thrown the actuating pressure will exhaust from the rear end of the piston chamber through the inlet port 4, the valve chamber $g$ and the exhaust port 6 to the atmosphere.

In its new position the valve will be held immovable by the pressure fluid flowing over the holding surface $o$ and through the front inlet passage 5 into the front end of the piston chamber B. This pressure fluid will actuate the piston C rearwardly and upon uncovering of the kicker passage 7, pressure fluid will flow therethrough to the front end of the valve chamber $g$ and act against the actuating surface $r$ to throw the valve $h$ rearwardly as the piston C approaches the rear end of the piston chamber B. When the piston is about to complete its rearward stroke and at which time the valve is thrown forwardly, the pressure fluid will escape to the front end of the piston chamber B through the inlet passage 5, the valve chamber g and the exhaust port 6 to the atmosphere.

During the reciprocations of the piston C a portion of pressure fluid will flow from the rear end of the piston chamber through the bore O in the piston and the passage K in the working implement to the bottom of the drill hole. Likewise, upon the admission of pressure fluid into the front end of the piston chamber C and upon retraction of the piston C, the flutes S will be drawn into the front end of the piston chamber and some pressure fluid will then flow through the flutes and the chuck mechanism into and through the drill steel.

The pressure fluid admitted into the drill hole in this manner is in the form of intermittent puffs and under most conditions of drilling is insufficient to adequately cleanse the drill hole. When detritus in the drill hole accumulates to an extent where intermittent puffs of pressure fluid of small volume no longer suffice to maintain a clean working face, the throttle valve z may be rotated from the position illustrated in Figure 1 to that shown in Figure 2. This shifting of the throttle valve will carry the port 13 into registry with the branch passage 10 and the port 14 will be moved into registry with the passage x. Pressure fluid will then flow through the branch passage 10 and the kicker passage 8 into the rear end of the valve chamber where it will act against the actuating surface t and move the valve h into its foremost limiting position. In the new position of the throttle valve pressure fluid will flow through the port 14 and the associated channels into the valve chamber, thence through the inlet passage 5 into the front end of the piston chamber B and actuate the piston C to its extreme rearmost position. The flutes S will thus be drawn rearwardly into the front end of the piston chamber B and the head of the piston C will form a closure for the kicker passage 8 at the point of communication of said passage with the piston chamber B.

With the parts in the position described, an uninterrupted flow of pressure fluid will take place directly from the throttle valve to and through the valve chamber and through the inlet passage 5 into the front end of the piston chamber, thence through the flutes S through the chuck mechanism and through the passage K in the working implement to the drill hole. The passages employed for supplying pressure fluid to the drill hole are, of course, of ample areas so that an unrestricted charge of pressure fluid may be directed into the drill hole. The detritus will thus be quickly removed from the drill hole and after the drill hole is cleansed the throttle valve z is returned to the position initially described and normal drilling may then be resumed.

I claim:

In a blowing device for a fluid actuated rock drill, the combination of a casing and a hollow working implement extending thereinto, said casing having a piston chamber and a valve chamber, an exhaust port for the valve chamber, a hammer piston in the piston chamber to actuate the working implement and having a passage to afford communication between the working implement and the front end of the piston chamber, front and rear inlet passages leading from the valve chamber to the piston chamber, kicker passages leading from the piston chamber to the ends of the valve chamber and being controlled by the piston, a branch passage opening into one of said kicker passages, a distributing valve in the valve chamber to control the inlet passages and to control communication between the inlet passages and the exhaust port, opposed end actuating areas and opposed intermediate holding areas on the valve, said actuating areas being subjected to pressure fluid supplied by the kicker passages for actuating the valve, a throttle valve chamber having an atmospheric vent, a supply passage connecting the throttle valve chamber with the valve chamber, a throttle valve in the throttle valve chamber having a groove to establish communication between the branch passage and the atmospheric vent, said throttle valve being movable to one position to supply pressure fluid to the valve chamber for distribution by the distributing valve and to communicate the branch passage with the atmospheric vent during the normal operation of the tool, said throttle valve being rotatable to another position to cut-off communication between the branch passage and the atmospheric vent and to supply pressure fluid to an actuating area for holding the valve immovable to communicate the rear end of the piston chamber with the exhaust port and to supply pressure fluid through the supply passage to the valve chamber to act against a holding area for assisting in holding the valve whence the pressure fluid flows through the front inlet passage, the front end of the piston chamber and the passage in the piston to the working implement.

WILLIAM A. SMITH, Sr.